(12) United States Patent
Ticknor

(10) Patent No.: US 9,326,453 B2
(45) Date of Patent: May 3, 2016

(54) CORE HARVESTER STORAGE APPARATUS AND METHOD

(71) Applicant: INNOVATIVE TURF PRODUCTS LLC, Naples, FL (US)

(72) Inventor: Jason Ticknor, Naples, FL (US)

( * ) Notice: Subject to any disclaimer, the term of this patent is extended or adjusted under 35 U.S.C. 154(b) by 0 days.

(21) Appl. No.: 14/594,091

(22) Filed: Jan. 10, 2015

(65) Prior Publication Data

US 2015/0198281 A1 Jul. 16, 2015

Related U.S. Application Data

(60) Provisional application No. 61/926,983, filed on Jan. 14, 2014.

(51) Int. Cl.
| | | |
|---|---|---|
| *A01B 73/00* | (2006.01) | |
| *A01G 1/12* | (2006.01) | |
| *A01D 75/00* | (2006.01) | |
| *B62B 3/10* | (2006.01) | |
| *A01D 51/00* | (2006.01) | |

(52) U.S. Cl.
CPC ............... *A01G 1/125* (2013.01); *A01D 51/00* (2013.01); *A01D 75/002* (2013.01); *B62B 3/10* (2013.01)

(58) Field of Classification Search
CPC .......... B62B 3/05; B62B 3/0618; B62B 3/10; B62B 3/102; B62B 2203/60; B62B 2203/70; B62B 2206/06; B62B 2203/10; B62B 2205/06; A01D 75/002; A01D 87/122; A01D 51/00; A01B 73/00; B60P 3/066; A01G 1/125

See application file for complete search history.

(56) References Cited

U.S. PATENT DOCUMENTS

| | | | | |
|---|---|---|---|---|
| 2,841,247 | A * | 7/1958 | Smalley | ............... 254/9 B |
| 3,053,372 | A * | 9/1962 | Gallagher | ......... A01D 87/122 198/302 |
| 5,628,170 | A * | 5/1997 | Vargas | ............ 56/16.4 R |
| 5,927,745 | A * | 7/1999 | Cunningham | ............. 280/652 |
| 6,322,061 | B1 * | 11/2001 | Maser et al. | ............... 269/17 |
| 6,419,245 | B1 * | 7/2002 | Trimble | ............ 280/79.11 |
| 7,628,408 | B2 * | 12/2009 | Kolesa | ............. B62B 3/08 280/47.27 |
| 8,251,379 | B2 * | 8/2012 | Watzke | ............... 280/35 |
| 8,342,544 | B1 * | 1/2013 | Blewett et al. | ............ 280/79.11 |
| 2007/0284214 | A1 * | 12/2007 | Canapa | ............ B65G 13/12 198/312 |
| 2014/0169922 | A1 * | 6/2014 | Cozza et al. | ............ 414/495 |
| 2015/0063965 | A1 * | 3/2015 | Frizzell | ............ 414/590 |

* cited by examiner

*Primary Examiner* — Saul Rodriguez
*Assistant Examiner* — Mark Hageman
(74) *Attorney, Agent, or Firm* — Uradnik Law Firm PC

(57) ABSTRACT

A core harvester storage rack assembly includes a frame including a first end and a second end, a plurality of wheels operatively coupled about a lower portion of the frame, a jack operatively coupled to an upper portion of the frame, the jack including a seat adapted to engage with an elevator assembly of the core harvester at a first point, a brace operatively coupled to the first end of the frame, the brace adapted to engage the elevator assembly of the core harvester at two spaced-apart points proximate a forward portion of the core harvester elevator assembly, so as to provide three points of support for the core harvester elevator assembly; and the second end of the frame is adapted to removably hold a conveyor assembly of the core harvester.

13 Claims, 23 Drawing Sheets

CORE HARVESTER STORAGE APPARATUS AND METHOD

FIELD OF THE DISCLOSURE

The invention relates generally to systems and methods for storing a core harvester, and more particularly in one exemplary embodiment, to systems and methods including a convenient, easy-to-use movable storage rack assembly for a core harvester assembly.

BACKGROUND

Aeration is often used to help promote healthy and beautiful turf (e.g., for a residential lawn, a sports field, golf course greens and fairways, etc.). Turf aeration typically includes the removal of small plugs, or cores, of soil from the turf. Such core removal generally helps reduce soil compaction and improves the ability of grass roots to expand into the soil. Core aeration also helps strengthen roots and enhances fertilizer and water uptake and use.

Immediately following core aeration, soil plugs typically remain on the surface of the turf. Such plugs might remain on the turf for weeks if left to decompose naturally. During such period the plugs might interfere with use of the turf and likely would appear unsightly (e.g., on a golf green or tee). To avoid these and other problems, the soil cores generally are removed from the surface of the turf. While such removal might be accomplished by hand (e.g., with a rake), facilities with large turf areas (e.g., golf courses) generally use an apparatus called a "core harvester" to pick up soil plugs.

While there are various different models or types of core harvesters available, such systems generally function as an implement removably added to a maintenance truck, cart, or other similar vehicle with an open rear box or other soil plug storage compartment. The maintenance truck moves the operating core harvester assembly about the aerated turf so that plugs are removed from the turf surface as desired. Such core harvester systems generally include an assembly for collecting plugs on a turf surface and for providing the plugs to an elevator assembly. The elevator assembly generally moves the plugs from a first position proximate the turf surface to a raised second position at the input of a conveyor assembly. The conveyor assembly transfers the plugs to the soil plug storage compartment of the maintenance truck. There, the plugs are held for later disposal as desired, e.g., at a particular desired location for fill.

Core harvesters tend to be large implements. Such systems typically include hydraulics to power the elevator and conveyor, one or more wheels to help support the weight of the core harvester, a strong and durable frame made of steel, etc. As a result, core harvesters are large, heavy, and unwieldly—particularly when being placed on or removed from a maintenance truck. Often, the process of removing a core harvester from a maintenance truck for storage takes multiple individuals a number of hours to complete. And, the failure to remove a core harvester from a maintenance truck typically means that the truck would not be available for other uses for an extended period of time due to the presence of the core harvester.

SUMMARY

The present disclosure provides core harvester storage systems and methods. In one exemplary embodiment, a movable rack is used to hold core harvester components.

Other benefits and advantages of the present disclosure will be appreciated from the following detailed description.

DETAILED DESCRIPTION

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to core harvesting or storage device use; etc. Such aspects related to this disclosure do not depart from the invention, and it is therefore intended that the invention not be limited by the certain aspects set forth of the events and circumstances related to this disclosure.

Figure 1:
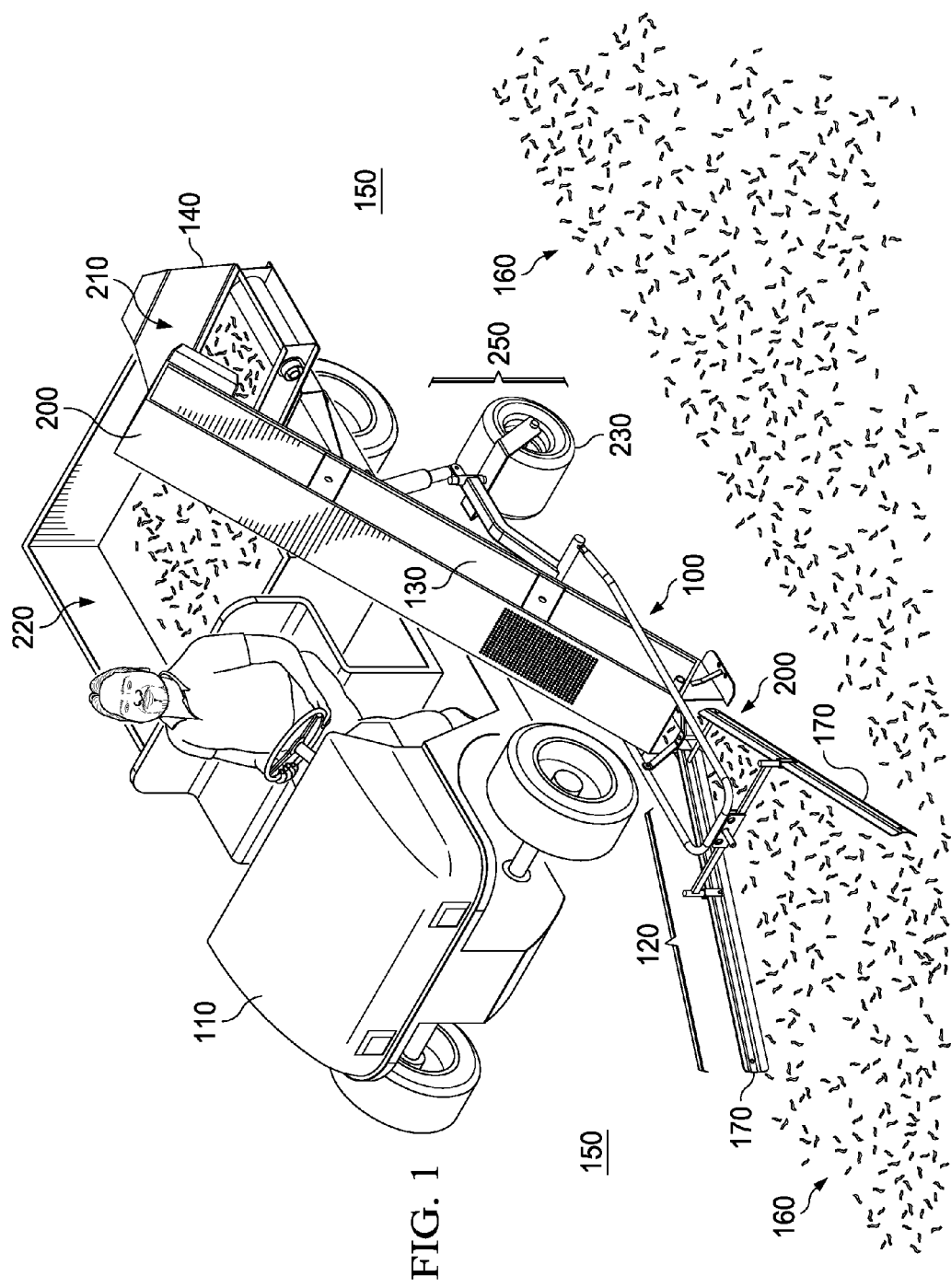
FIG. 1 is a perspective view of an exemplary core harvester mounted on a maintenance vehicle.
Figure 2:
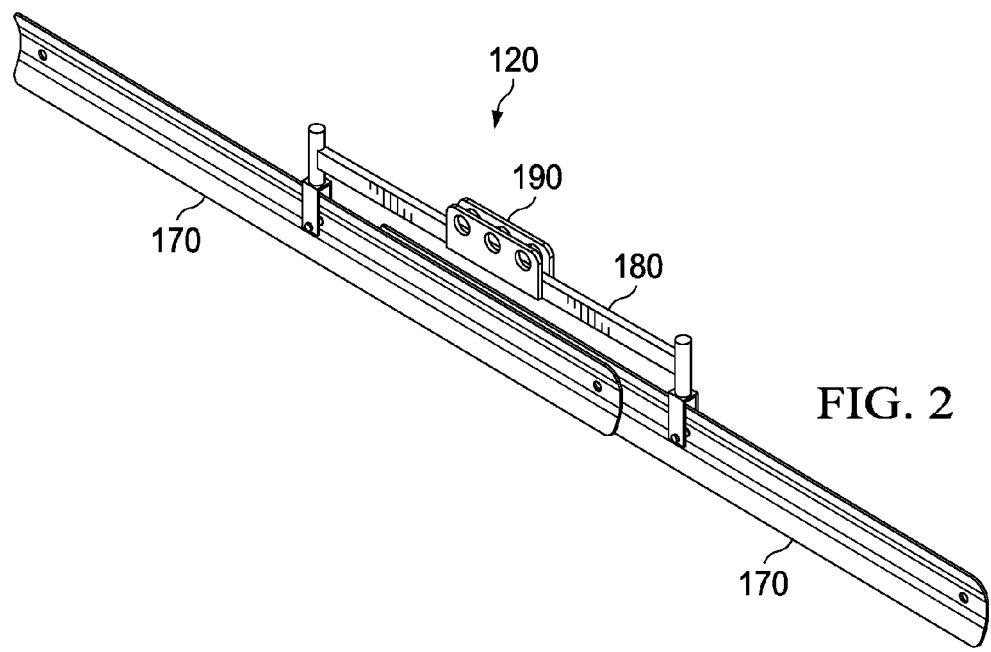
FIG. 2 is a perspective view of an exemplary core harvester collector assembly disposed for storage.
Figure 3:
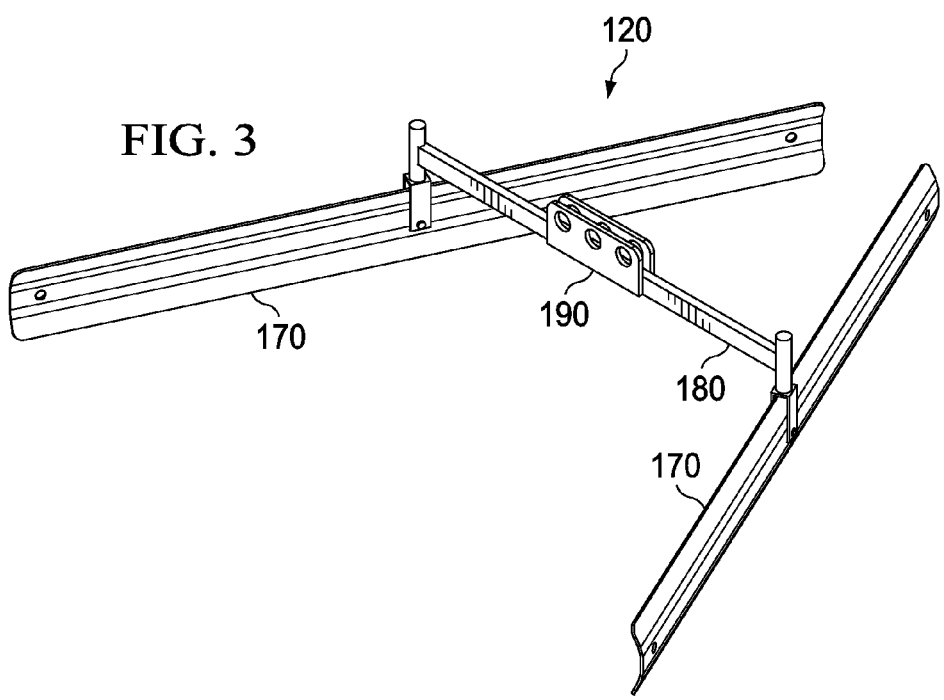
FIG. 3 is a perspective view of the exemplary core harvester collector assembly shown in FIG. 2, disposed for a core-collecting application.

Turning now to the drawings, FIG. 1 shows an exemplary core harvester assembly 100 fitted on a maintenance truck 110 for operation. In one aspect, the core harvester assembly 100 in general comprises three sub-assemblies: (a) a collector assembly 120; (b) an elevator assembly 130; and (c) a conveyor assembly 140.

The three core harvester sub-assemblies may be integrated or integrally attached to form a single unit, or not. In the exemplary embodiment shown in FIG. 1, the collector assembly 120 is removably coupled to the elevator assembly 130, while the conveyor assembly 140 is removably operably positioned (but not integrally attached or connected) with respect to the elevator assembly 130.

As shown in FIG. 1, core harvesting turf 150 includes a plurality of plugs 160 spread across a portion of the turf surface. A pair of wipers 170 are moved across the turf surface to gather the plugs 160. The turf surface wipers 170 advantageously are operably connected to each other and to the elevator assembly 130 using mounting assembly 180, including mounting bracket 190. In one aspect, the turf surface wipers 170 are disposed as desired during operation to funnel the plugs 160 to the entrance 200 of elevator assembly 130.

Elevator assembly 130 in one exemplary embodiment includes a means for conveying the plugs 160 from the turf 150 to an elevated position proximate the input to conveyor assembly 140. In the embodiment shown, the conveying means of elevator assembly 130 includes a belt upon which the plugs 160 are moved. Alternate conveying means also may be used (e.g., an auger or screw-type conveyor), depending upon the circumstances involved in a particular desired application. The elevator assembly 130 may include a cover 200 that serves to help retain the plugs 160 during travel, and also to help protect users from exposure to and contact with the belt and other moving equipment, to help avoid possible injury.

As shown in the drawings, at the output 210 of elevator assembly 130, the soil plugs 160 are deposited onto conveyor assembly 140. The assembly 140 directs the plugs 160 into the storage area 220 of maintenance truck 110, e.g., by a hydraulically-actuated belt or other conveyor.

Figure 12:
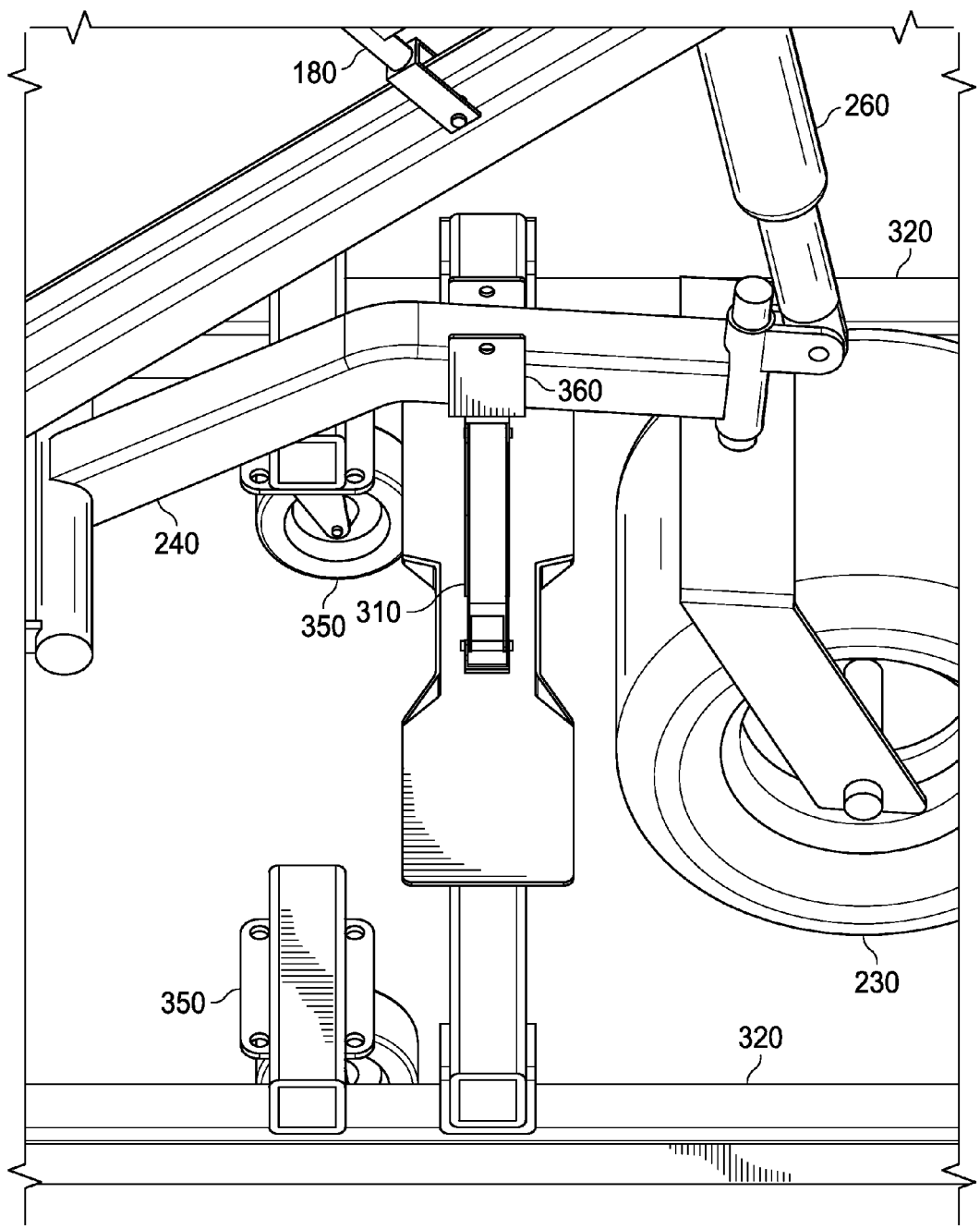
FIG. 12 is a perspective view from the side of a part of a central portion of an exemplary core harvester assembly disposed upon an exemplary embodiment of a core harvester storage assembly.

Conveyor assembly 140 and elevator assembly 130 may be suitably mounted to maintenance truck 110 to promote efficient operation. As shown in the drawings, the core harvester assembly 100 is large, and it typically is heavy. In fact, attaching the core harvester 100 to the maintenance truck 110 naturally tends to tilt the truck 110 toward the side at which the harvester 100 is coupled. To help offset such tilting, the elevator assembly 130 may include a support assembly 250. In the embodiment shown in the drawings, the support assembly 250 includes a wheel 230 operatively coupled to an axle 240 and an adjustable shock 260 (See, e.g., FIG. 12). The shock 260 may be selected and/or may be adjusted, to provide a desired lift to the elevator assembly 130 and to take some of the weight of the core harvester 100 off of the maintenance truck 110. In that way, the selection and/or adjustment of the shock 260 may be used to help level the maintenance truck 110 during operation.

Figure 7:
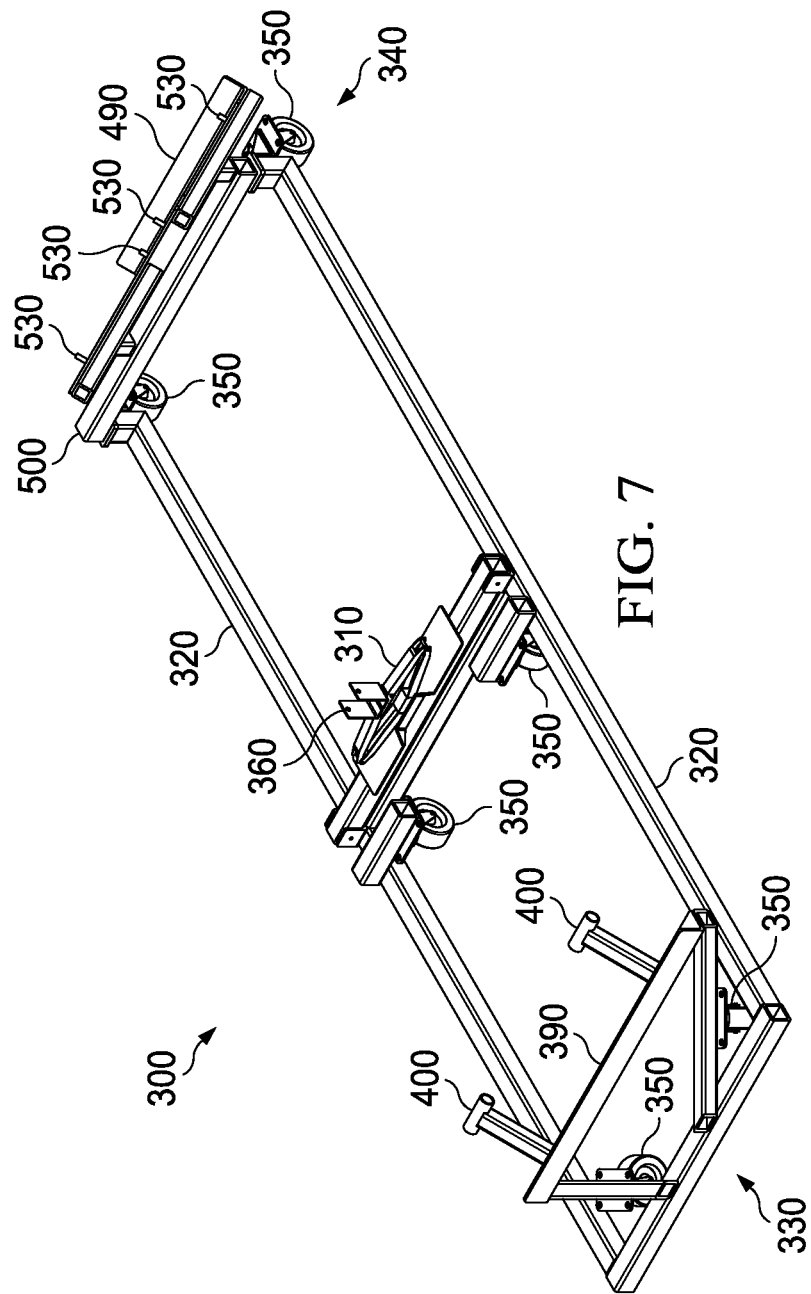
FIG. 7 is a perspective view of an exemplary embodiment of a core harvester storage assembly.
Figure 8:
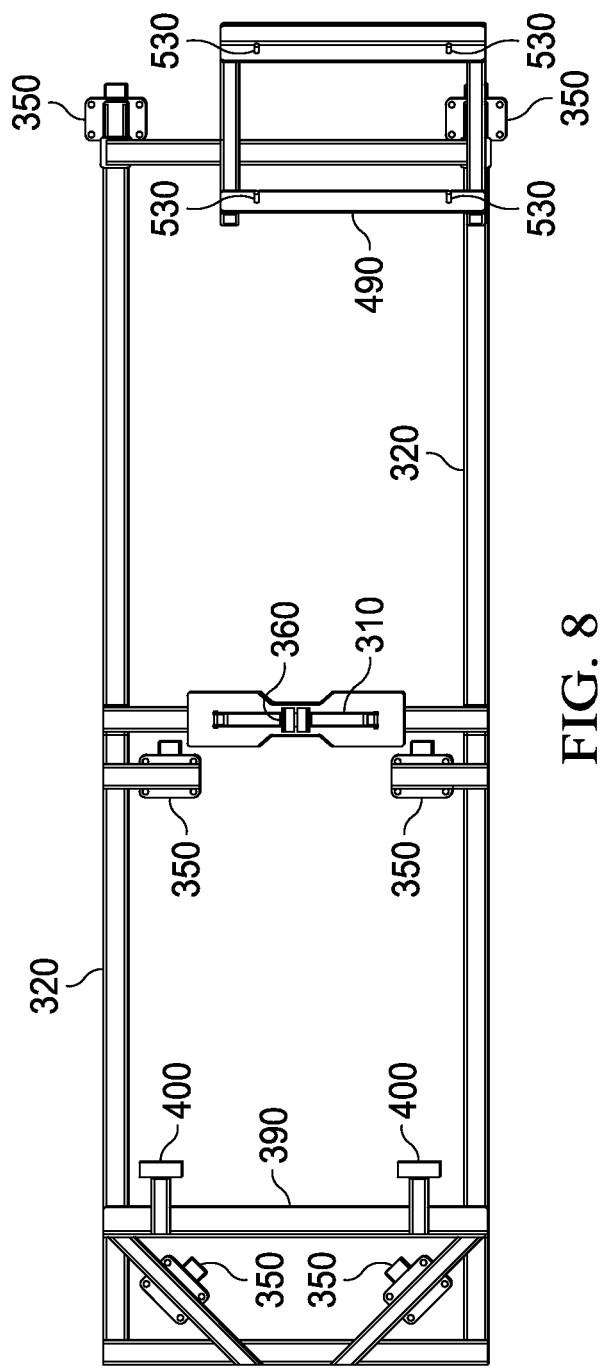
FIG. 8 is a top view of the exemplary embodiment of a core harvester storage assembly shown in FIG. 7.

In one aspect, then, this disclosure describes a core harvester storage system comprising a storage rack assembly 300. See FIG. 7. The rack 300 may include a jack 310 operatively coupled to a frame 320. In one embodiment, the frame 320 comprises a generally rectangular support including a first end 330 and a second end 340. Positioned about the frame 320, and operatively coupled thereto, may be one or more wheels 350 upon which the frame 320 and jack 310 are supported during use. The wheels 350 may be casters or other such wheels capable of handling a heavy load, and each wheel 350 may swivel about a stem or other axis to help promote ease of movement of the storage rack assembly 300.

Figure 9A:
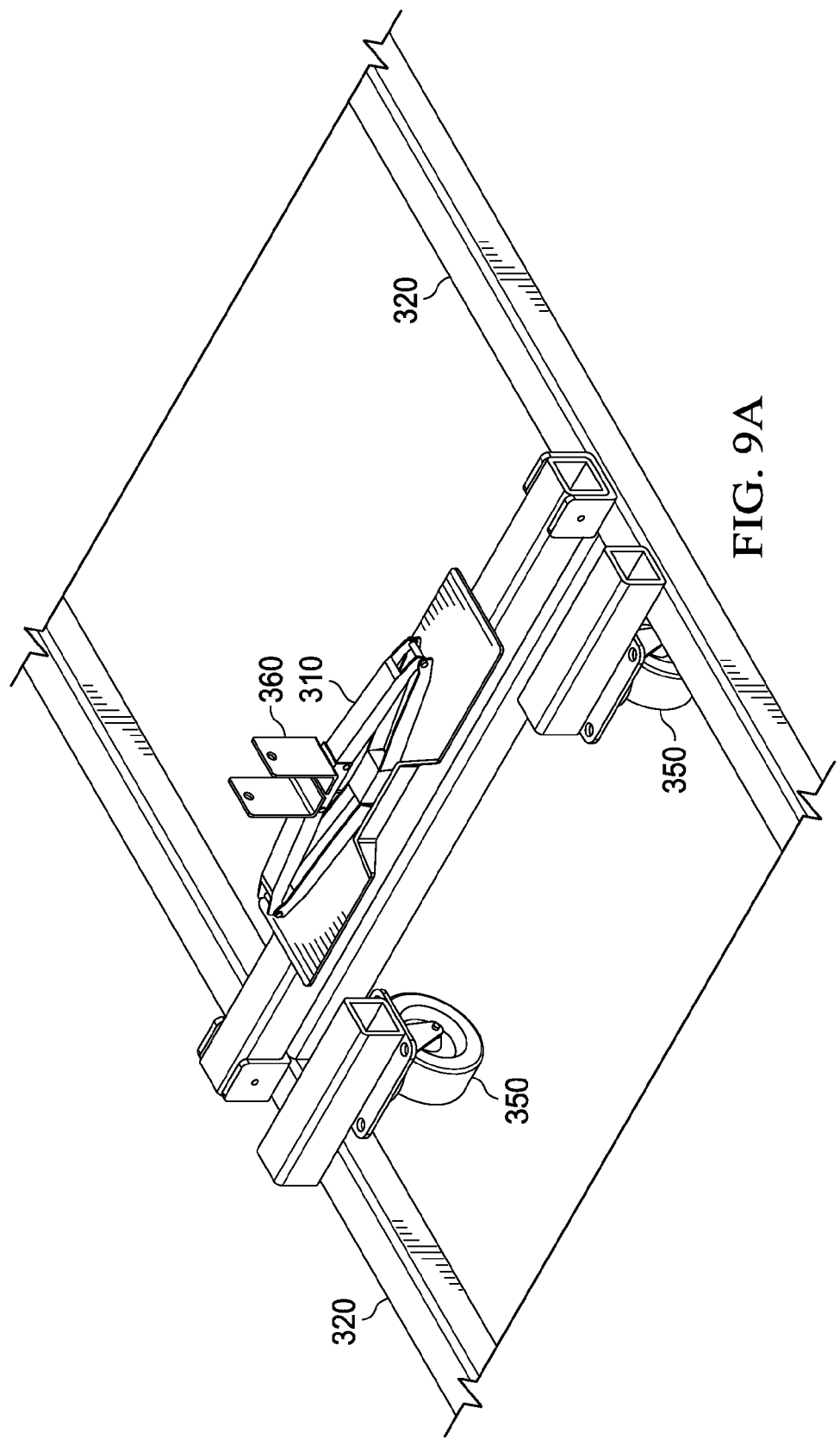
FIG. 9A is a perspective view of the center portion of the exemplary embodiment of a core harvester storage assembly shown in FIG. 7.
Figure 9B:
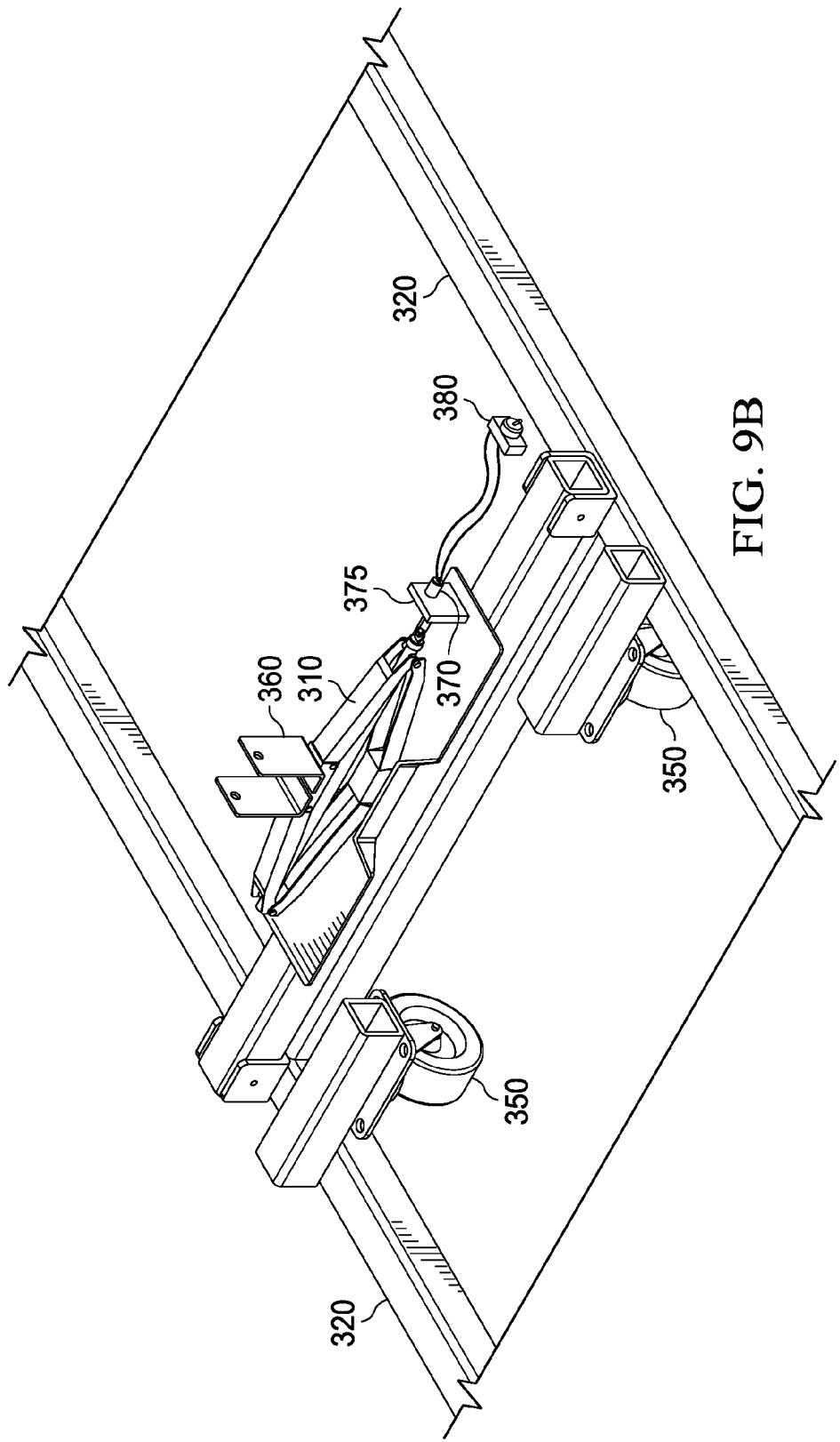
FIG. 9B is a perspective view of another embodiment of the exemplary embodiment of a core harvester storage assembly shown in FIG. 7, which includes a motor and switch.

In one embodiment, the jack 310 may be generally centrally located relative to the frame 320. The jack 310 may be adapted with a seat 360. The seat 360 may be operatively configured to engage a portion of the core harvester elevator to help support the elevator during its storage. As shown in the drawings, the seat 360 comprises a generally u-shaped member adapted to engage with the axle 240 connecting the core harvester wheel 230 to elevator assembly 130. Advantageously, once fully engaged to the core harvester elevator, the jack 310 may be used to lift and to maintain the core harvester wheel 230 above the ground. In that way, the core harvester wheel 230 does not interfere with or otherwise inhibit movement of the storage rack assembly 300 with the core harvester. The jack 310 may be a manually adjusted screw-type or scissors jack. Alternately, as shown in FIG. 9B, the jack may comprise an assembly including a motor 370 (hydraulic, battery-powered, electric, etc.) operatively coupled to the jack (e.g., via a gear box 375) to automatically raise and lower the core harvester as desired, e.g., under control of and by using switch 380 that is operatively coupled to the motor 370.

Figure 10:
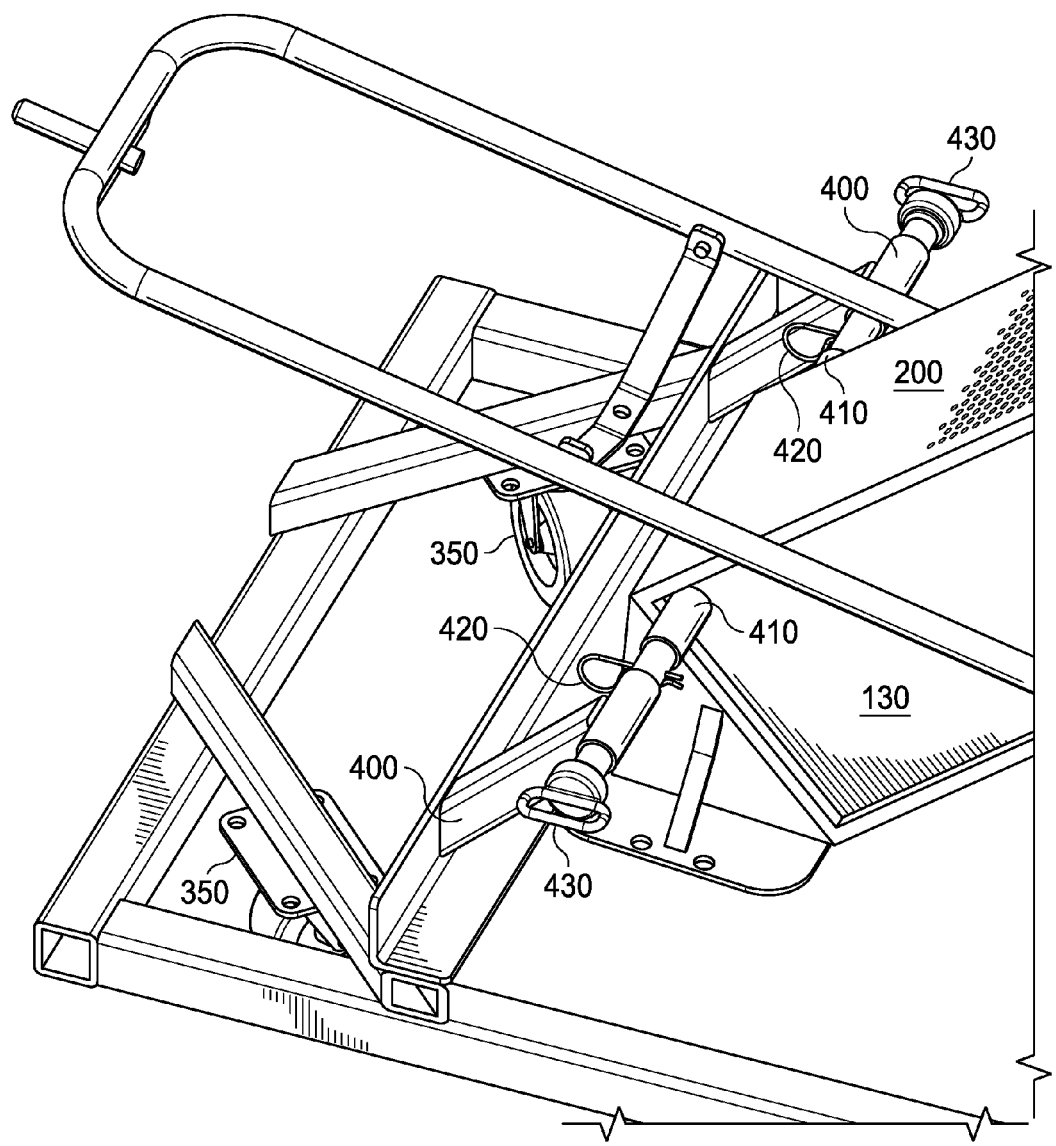
FIG. 10 is a perspective view from the side of a part of a forward portion of an exemplary core harvester assembly disposed upon an exemplary embodiment of a core harvester storage assembly.
Figure 11:
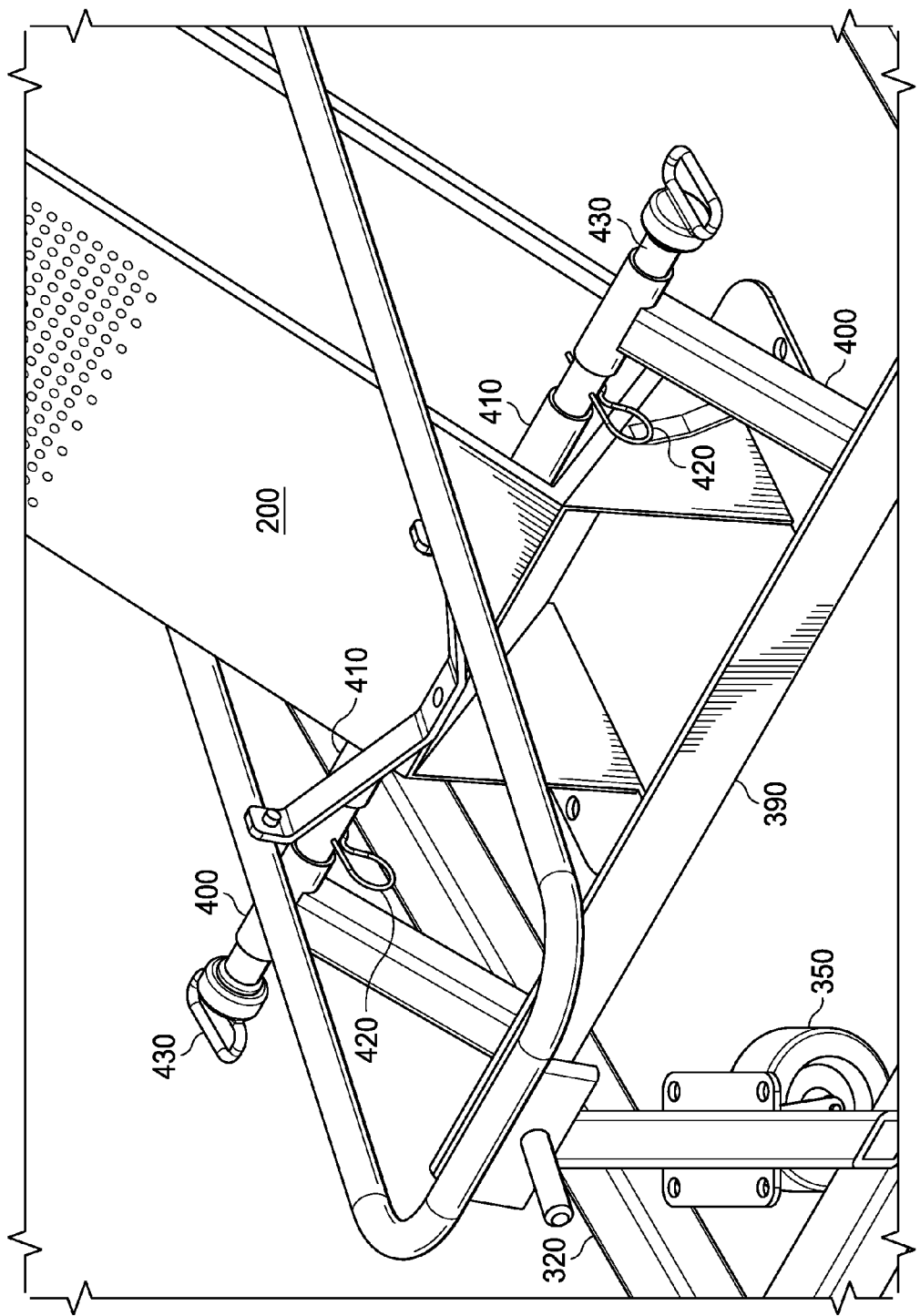
FIG. 11 is a perspective view from the front of a part of a forward portion of an exemplary core harvester assembly disposed upon an exemplary embodiment of a core harvester storage assembly.

As shown in the drawings, the first end 330 of the storage rack 300 may be adapted to operatively couple to a portion of the elevator assembly 130. In the embodiment shown, the first end 330 includes a rigid brace 390 including two connectors 400. In one aspect, the connectors 400 as shown are T-shaped connectors with tubular cross pieces. The connectors 400 are positioned to attach to the elevator assembly 130 at spaced-apart sites, e.g., two sites proximate the forward location at which the plug collecting assembly 120 operatively couples to the elevator assembly 130. Such sites are adapted to receive and removably couple with the connectors. For example, in the embodiment shown in the drawings (see, e.g., FIG. 10), the sites comprise two spaced tubular extensions 410 extending in opposite directions from opposite sides of the elevator assembly 130. A pin 430 thus may be removably positioned through each tubular cross piece of T-shaped connector 400, with one end of pin 430 inserted or otherwise disposed within or linked to a tubular extension 410. A cotter key or other suitable holding mechanism 420 may secure the pin 430 in place to help prevent its inadvertent removal. In that way, the storage rack assembly 300 may securely support the forward end of the elevator assembly. That is, with the connectors 400 operatively coupled to the frame 320 of the storage rack assembly 300, each connector 400 defines a point of support for the elevator assembly 130.

Thus, during use of the storage rack assembly 300, the jack assembly 310, including seat 360, and the connectors 400 may provide at least three points of support for the elevator assembly 130 of the core harvester. In an alternate embodiment, additional support points may be provided simply by providing one or more additional connectors operatively coupled to the frame at one or more particular desired locations.

Figure 13A:
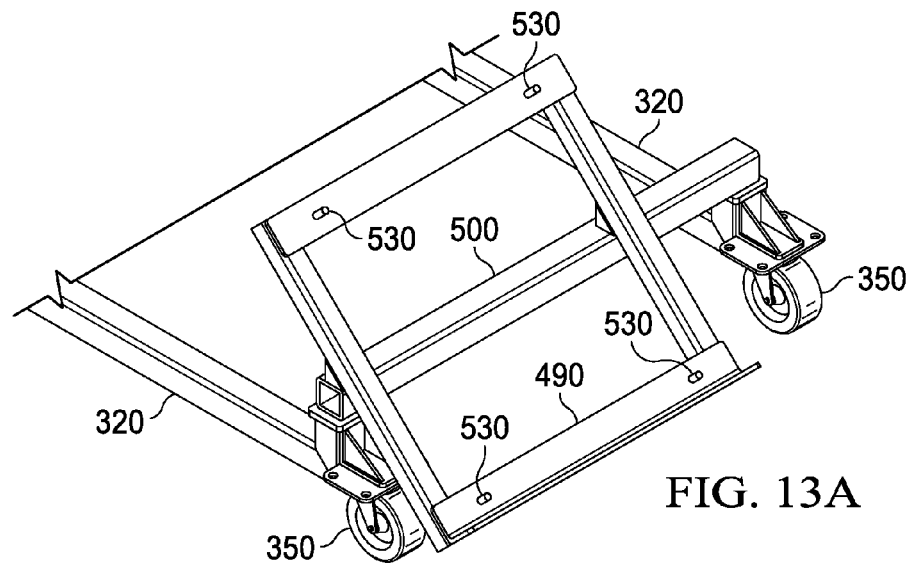
FIG. 13A is a perspective view of part of an end portion of an exemplary core harvester storage assembly, which is adapted to hold an exemplary core harvester conveyor assembly.
Figure 13B:
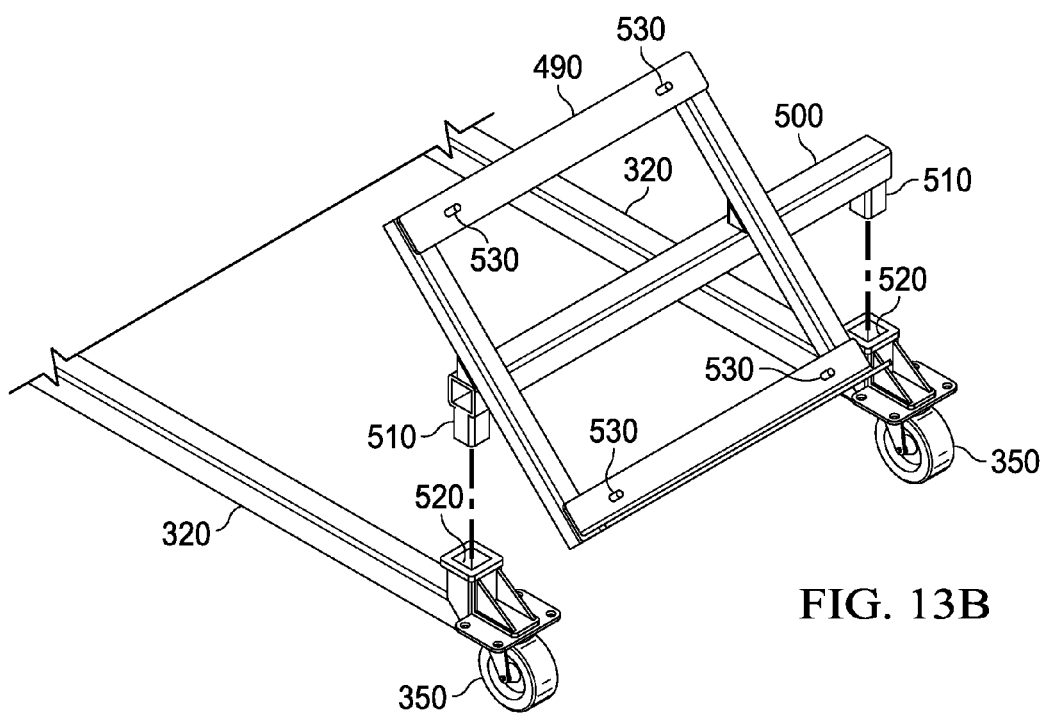
FIG. 13B is a perspective view of part of an end portion of an exemplary core harvester storage assembly, which is adapted to hold an exemplary core harvester conveyor assembly, illustrating an exemplary removal of a part of the end portion, to allow positioning of the storage rack assembly proximate a core harvester to be stored.

The second end 340 of the storage rack assembly 300 may be adapted to secure and store the conveyor assembly 140 such that the entire core harvester assembly is compactly arranged on the rack 300. As described in the drawings (see, e.g., FIGS. 13A and 13B) for the exemplary embodiment shown, a support frame 490 may include or be operatively coupled to a bar 500 extending between two portions of the frame 320. The bar 500 may be adapted to releasably engage the frame 320, e.g., with one or more male posts 510 removably insertable within one or more female receiver portions 520 of the frame 320. The support frame 490 operatively coupled to the bar 500 may be a table, platform, framework, or other support adapted to engage with the conveyor assembly 140 during storage of the core harvester. As shown in the drawings, the frame 490 includes a plurality of posts 530 that may mate with holes or slots 540 of the mounting bracket 550 used to attach the conveyor assembly 140 to a maintenance truck 110 (see FIG. 4). The frame 490 advantageously may be angled, oriented, or otherwise configured and disposed to promote the ease of: coupling/decoupling support 490 to/from frame 320; coupling/decoupling support 490 and conveyor assembly 140; and storage of conveyor assembly 140 compactly along with the other portions of the core harvester.

Figure 4:
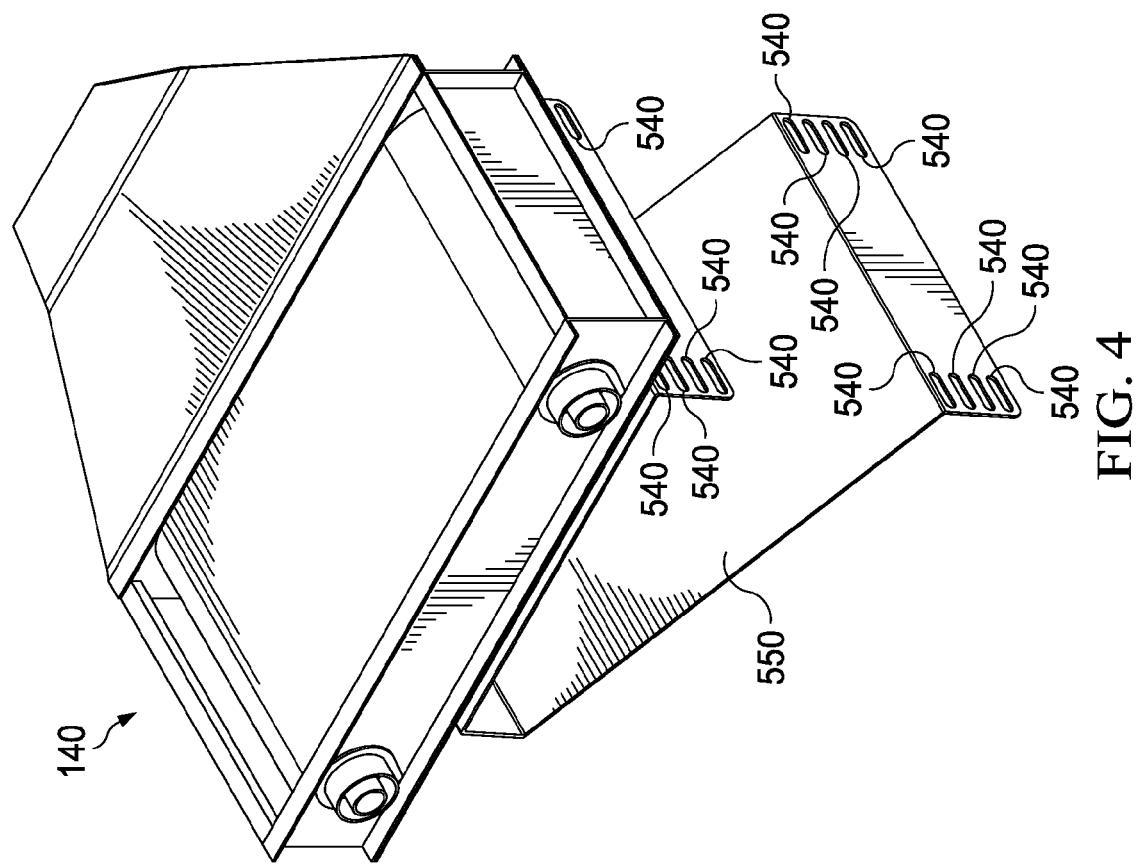
FIG. 4 is a perspective view of an exemplary core harvester conveyor assembly.
Figure 6:
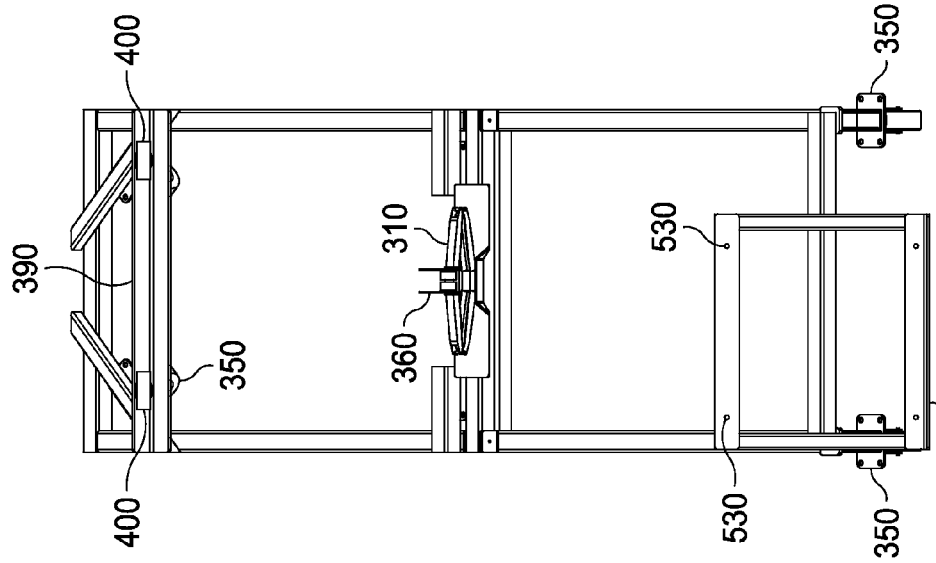
FIG. 6 is a perspective view from above of an exemplary embodiment of a core harvester storage assembly.
Figure 5:
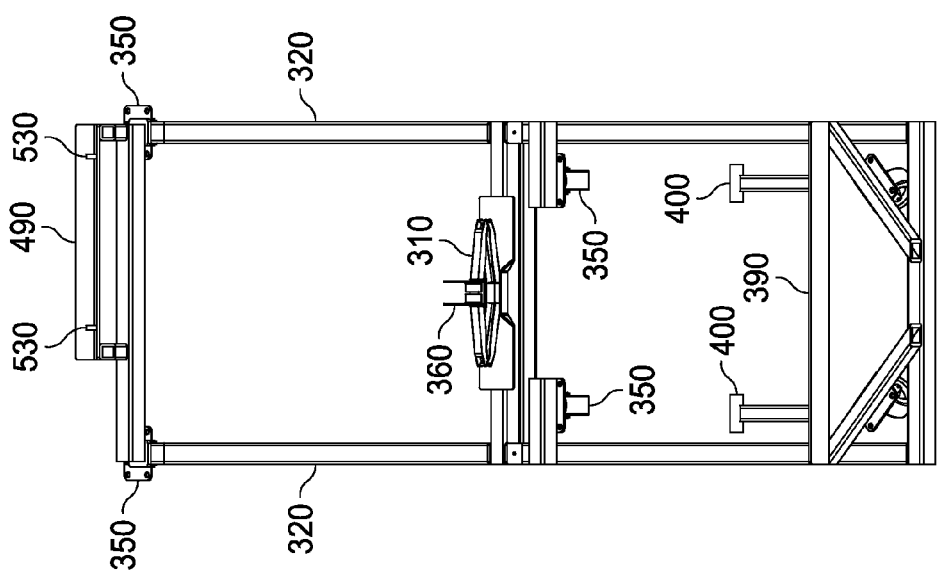
FIG. 5 is a perspective view from above of an exemplary embodiment of a core harvester storage assembly.
Figure 14A:
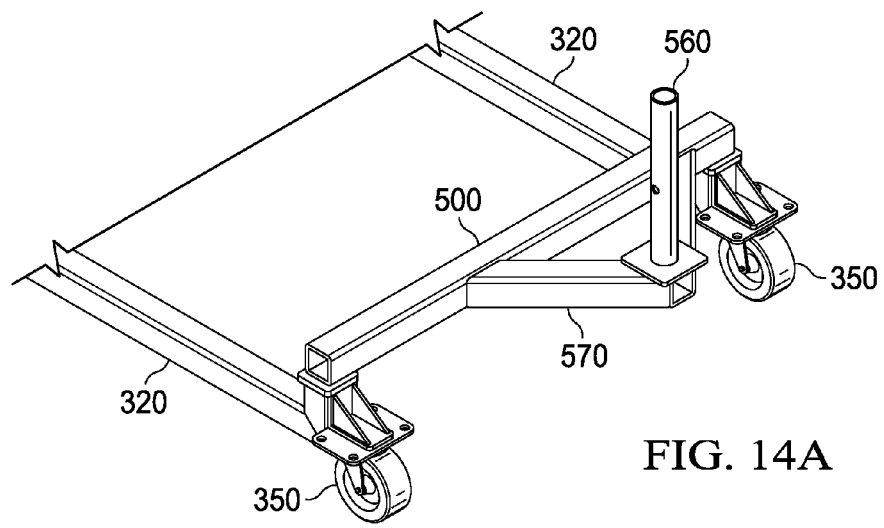
FIG. 14A is a perspective view of part of an end portion of another exemplary core harvester storage assembly, which is adapted to hold an alternate embodiment of an exemplary core harvester conveyor assembly.
Figure 14B:
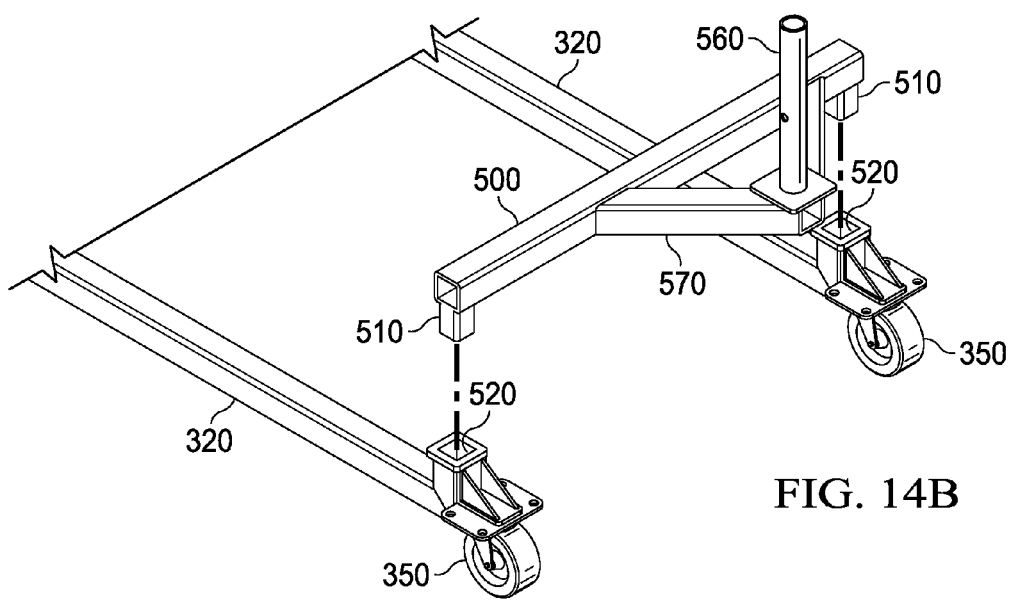
FIG. 14B is a perspective view of part of an end portion of another exemplary core harvester storage assembly, which is adapted to hold an alternate embodiment of an exemplary core harvester conveyor assembly, illustrating an exemplary removal of a part of the end portion, to allow positioning of the storage rack assembly proximate a core harvester to be stored.
Figure 15:
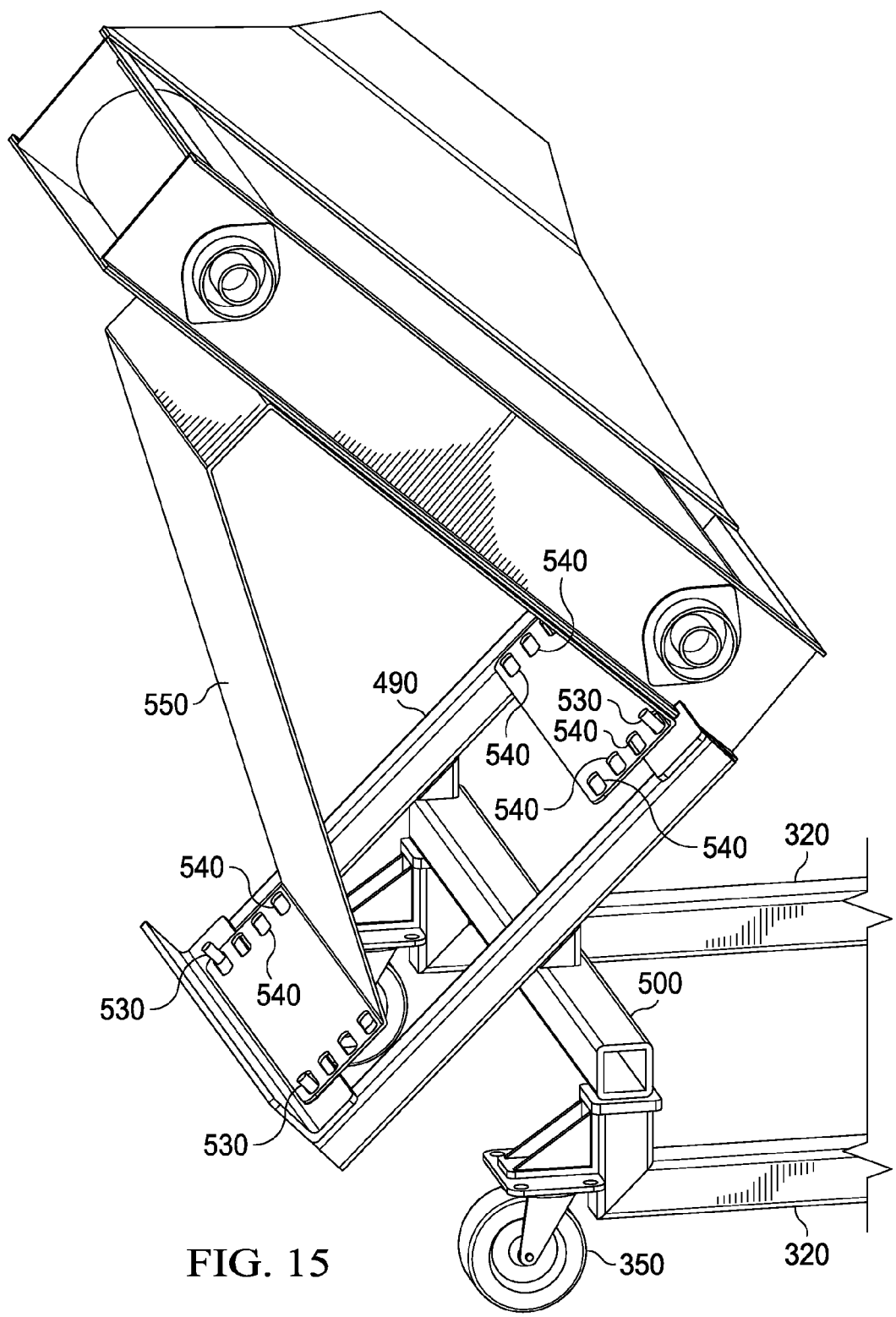
FIG. 15 is a perspective view of an exemplary core harvester conveyor assembly disposed upon a portion of an exemplary core harvester storage rack assembly for storage.
Figure 16:
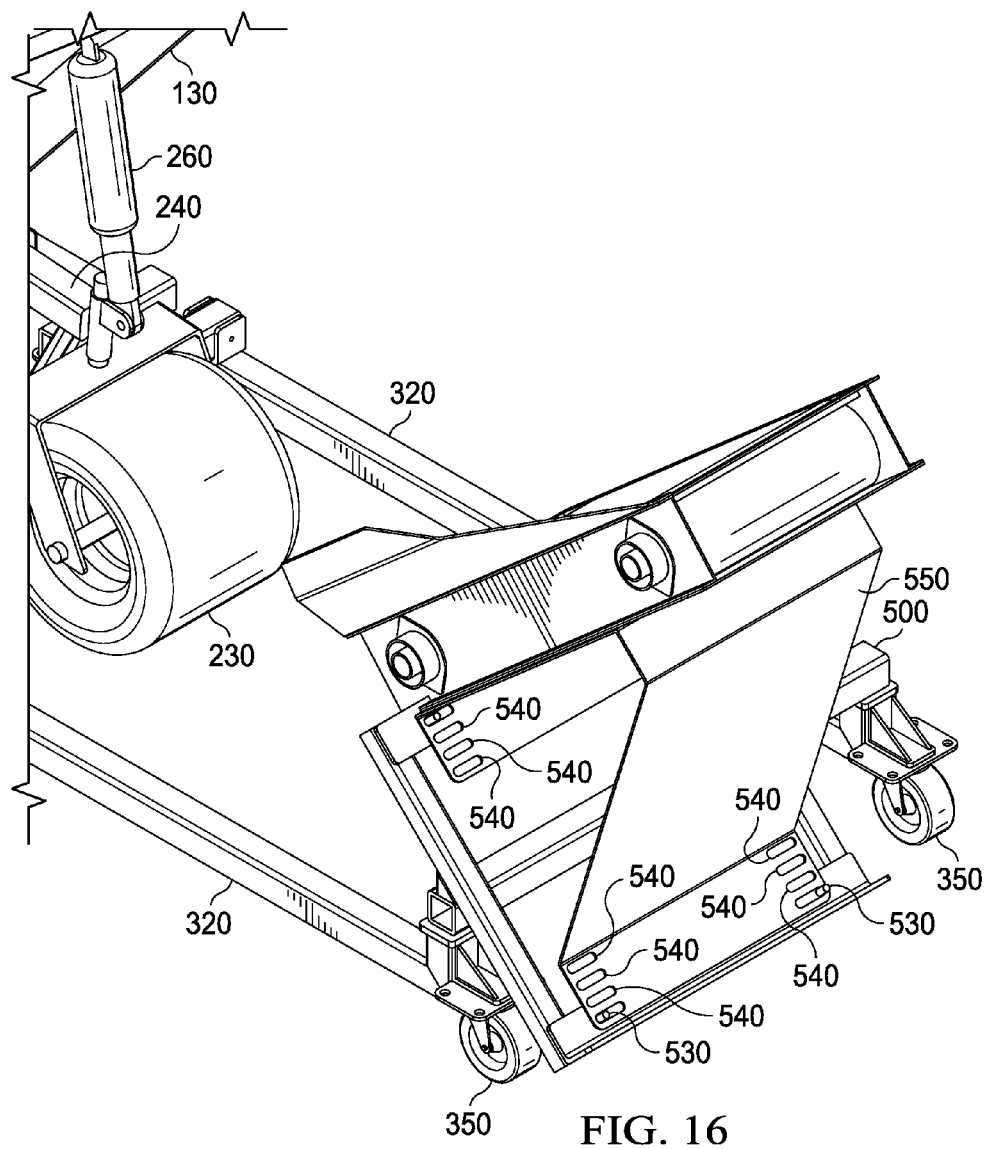
FIG. 16 is a perspective view of an exemplary core harvester conveyor assembly disposed upon a portion of an exemplary core harvester storage rack assembly for storage.
Figure 17:
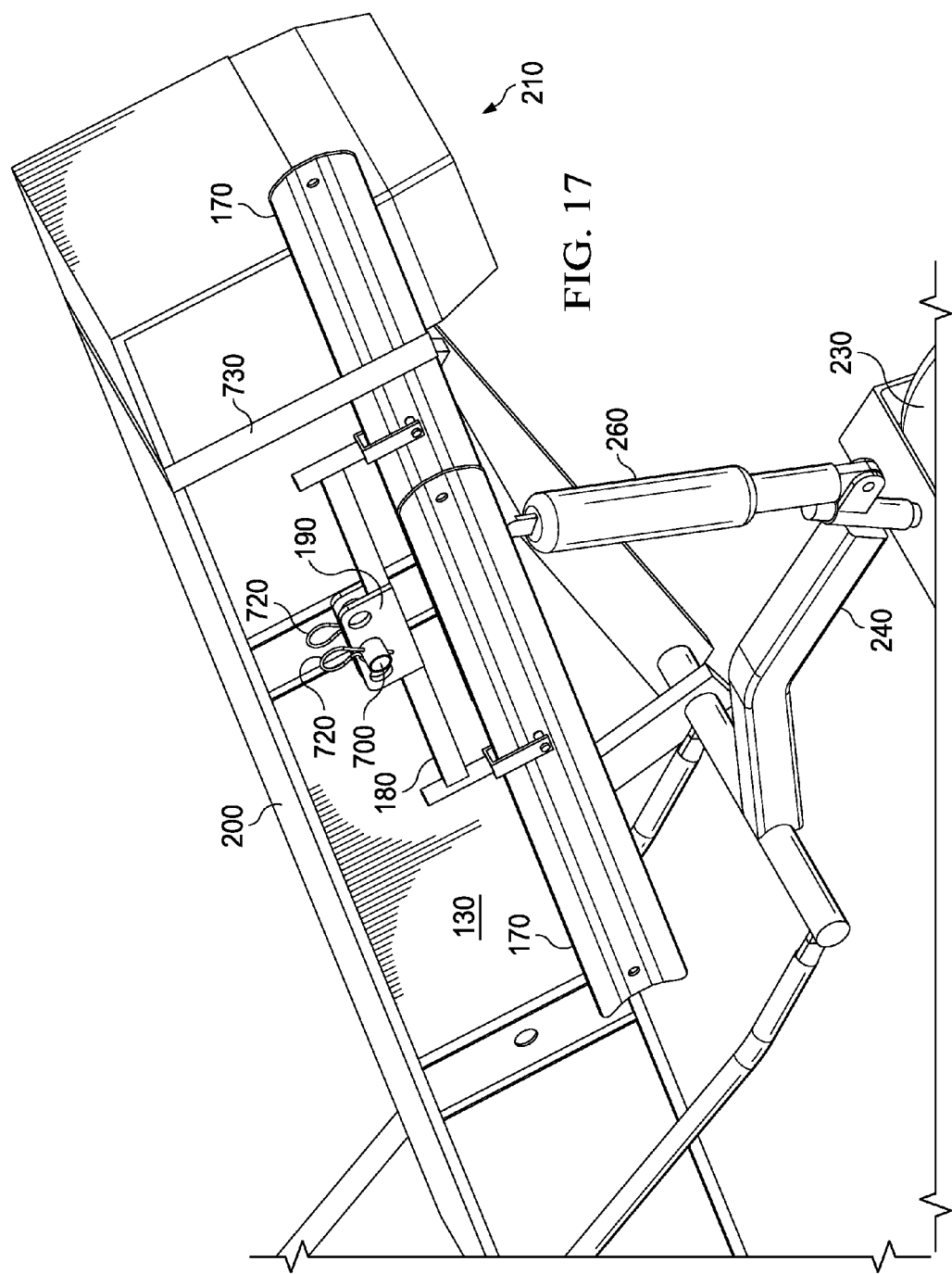
FIG. 17 is a perspective view of an exemplary core harvester collector assembly disposed upon a portion of an exemplary core harvester for storage.
Figure 18:
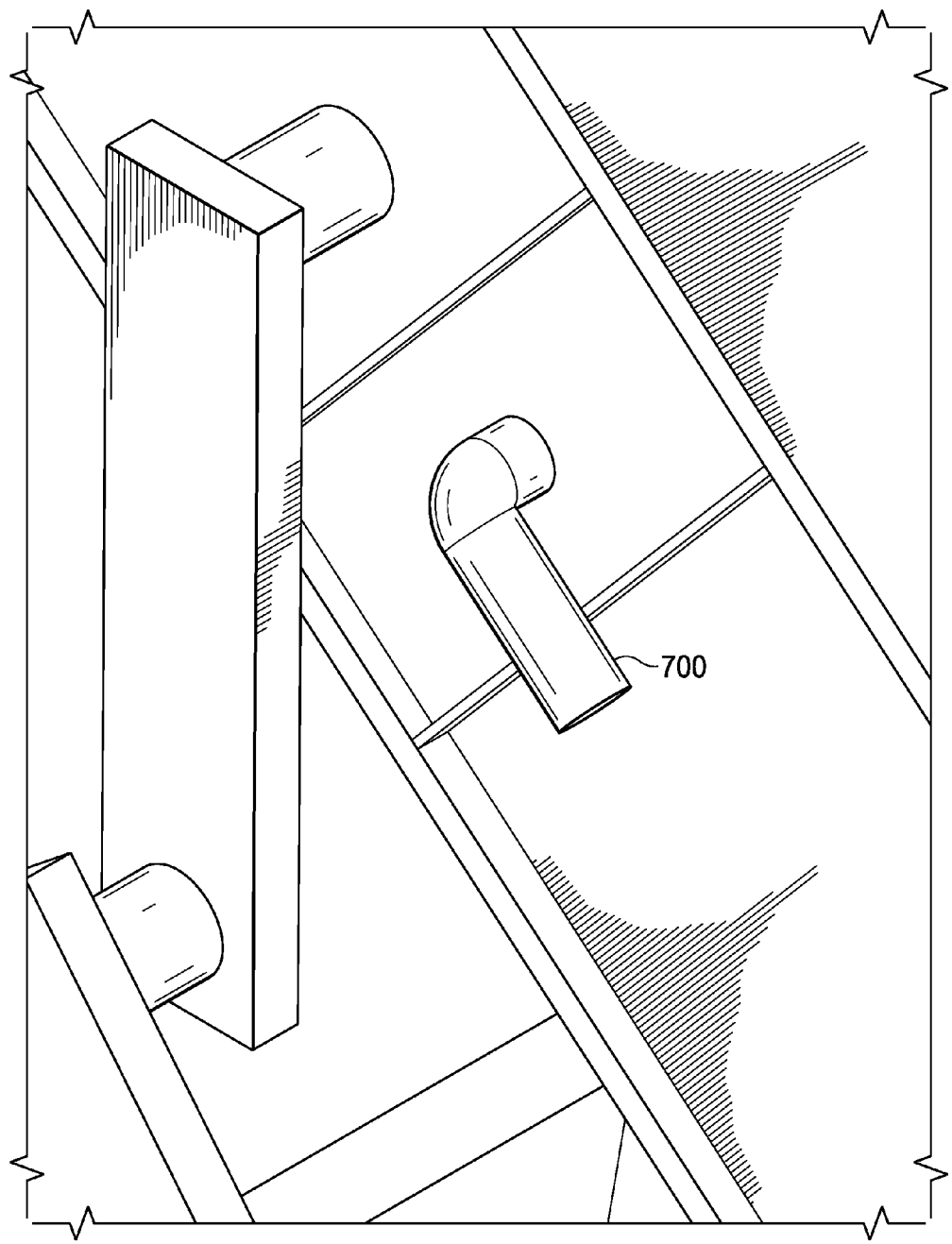
FIG. 18 is a perspective view of one end of a pin for holding the collector assembly shown in FIG. 17.
Figure 19:
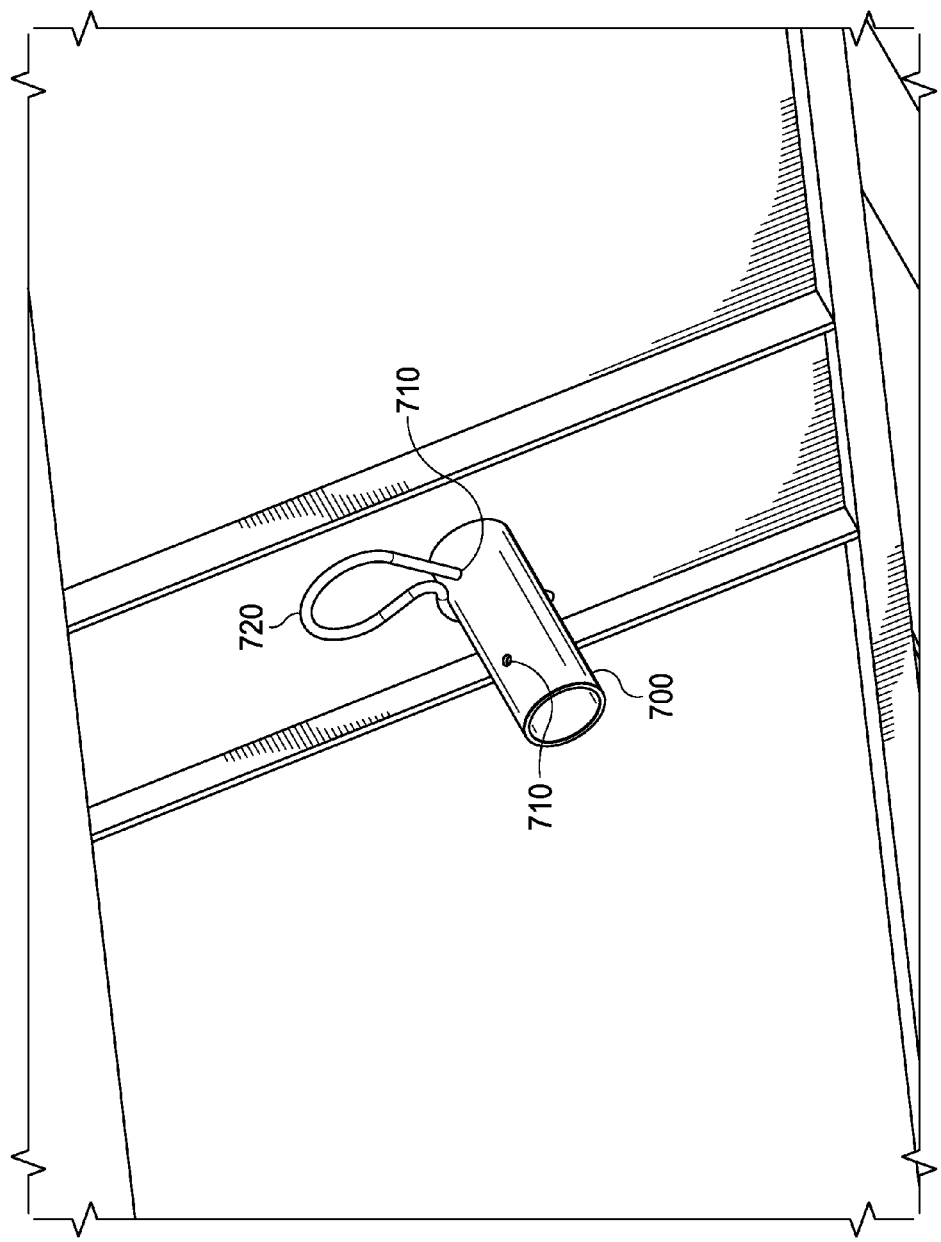
FIG. 19 is a perspective view of an end of a pin for holding the collector assembly shown in FIG. 17, shown prior to disposition of the collector assembly upon the pin end.
Figure 20:
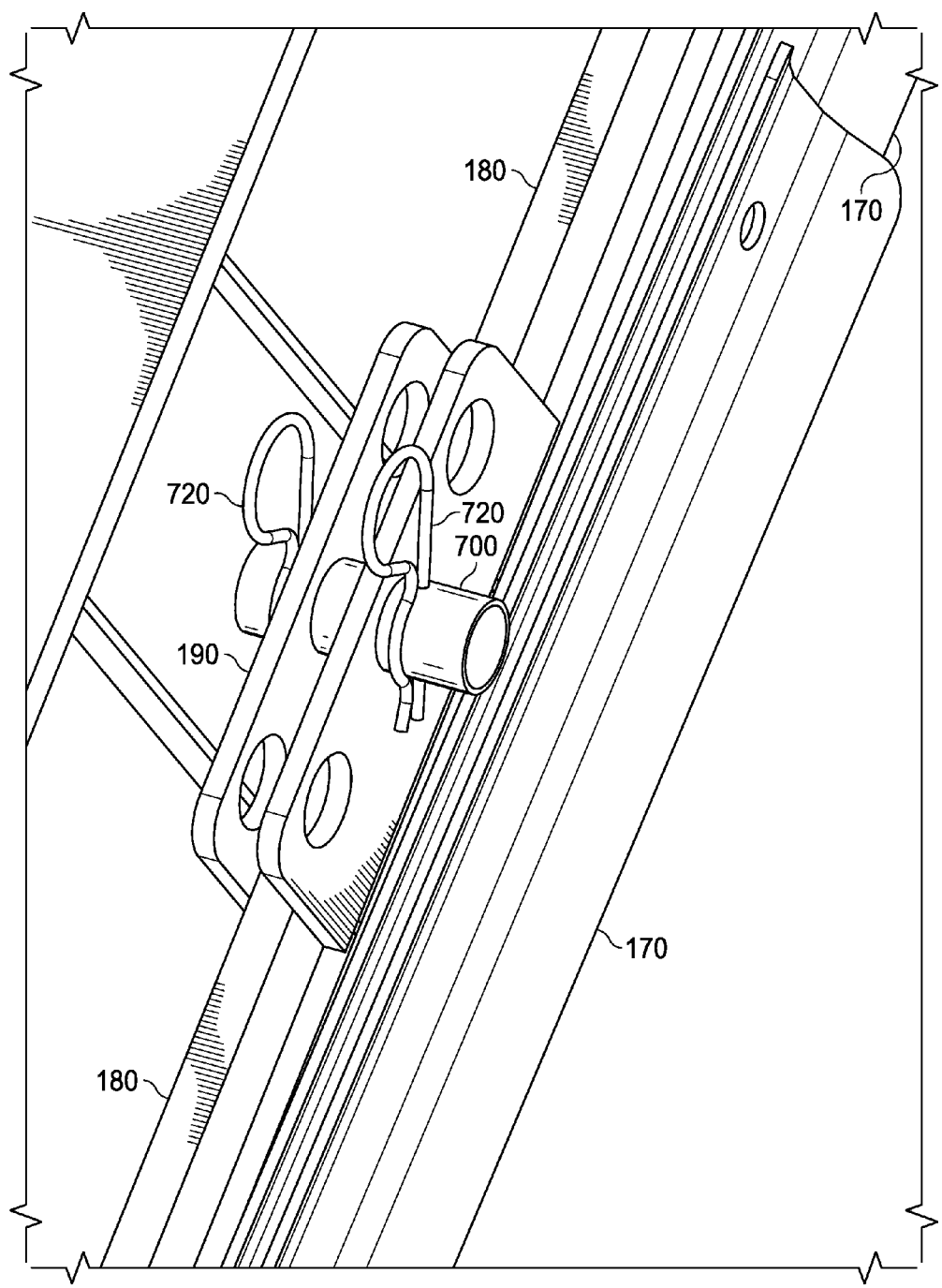
FIG. 20 is a perspective view of the pin end of FIG. 19, shown after disposition of the collector assembly upon the pin end.
Figure 21:
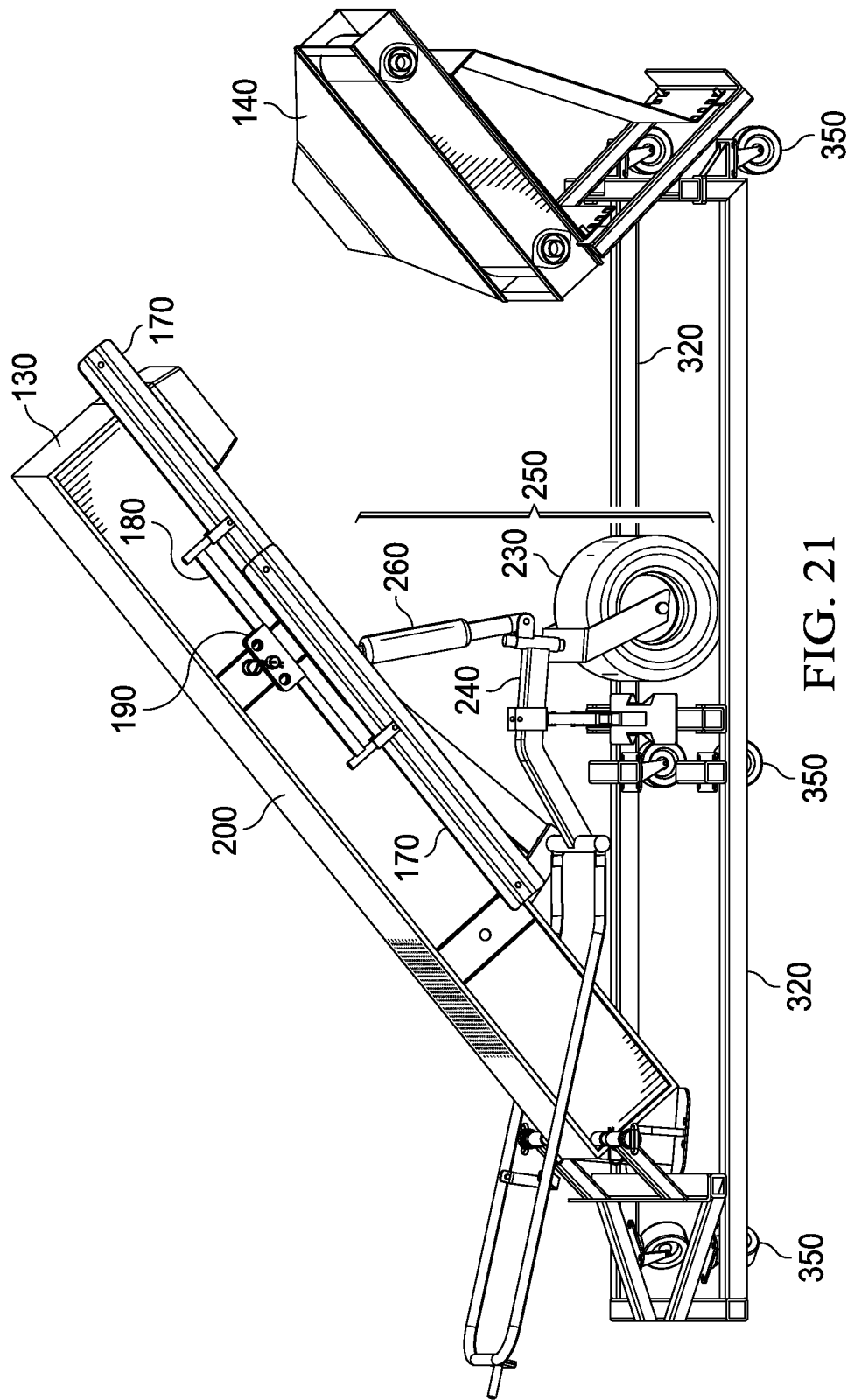
FIG. 21 is a perspective view of an exemplary core harvester assembly stored upon an exemplary core harvester storage assembly.

In an alternate embodiment (see FIGS. 14A and 14B), a support frame 570 is adapted to removably operatively couple to a means for connecting the conveyor assembly to a maintenance truck, where such connecting means does not include a mounting bracket 550 as shown in the drawings (e.g., FIG. 4). In such alternate embodiment, the frame 570 coupled to bar 500 may comprise a vertical post 560 upon or within which the alternate conveyor assembly connecting means may be placed. See FIGS. 14A-14B.

Figure 22:
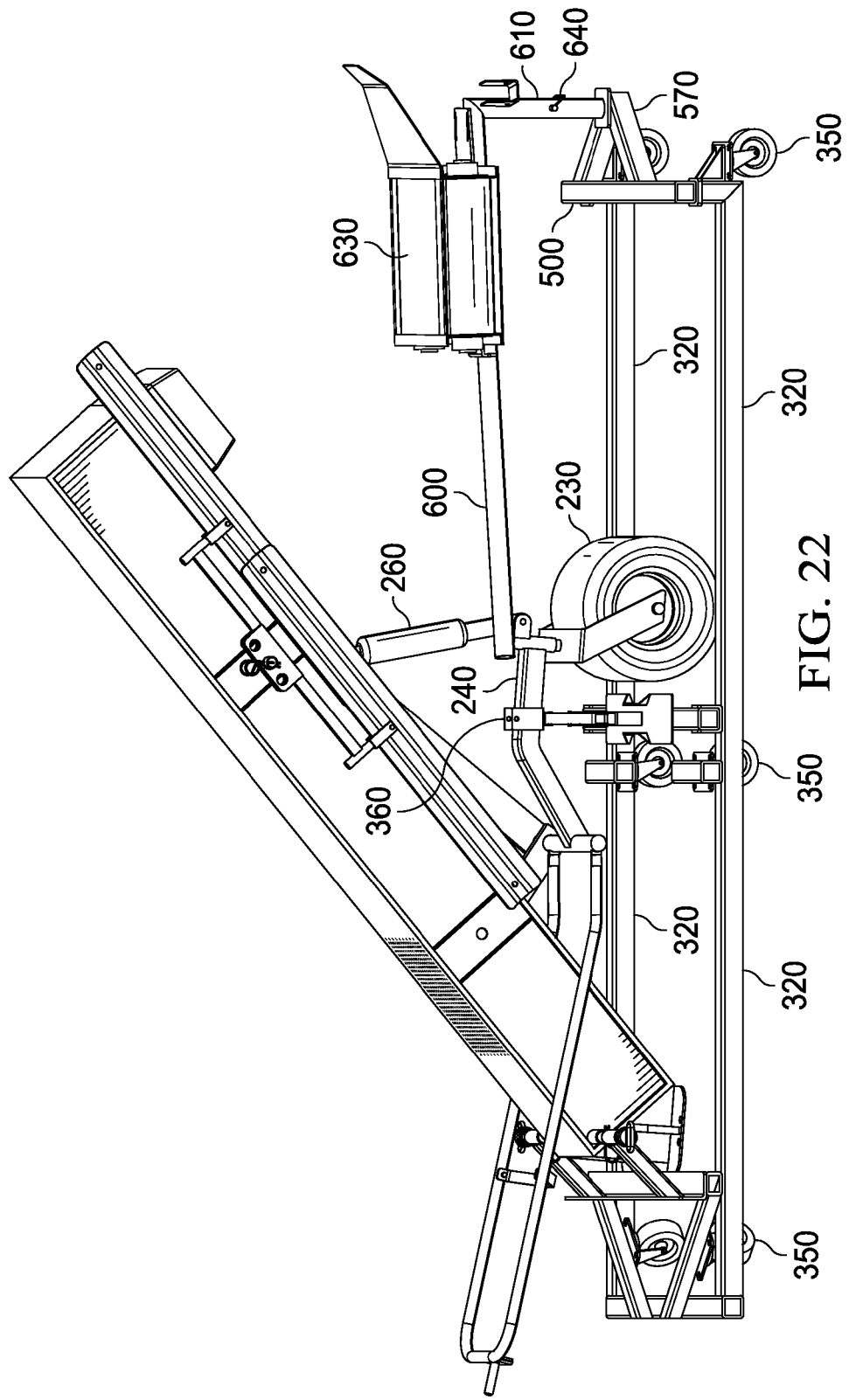
FIG. 22 is a perspective view of another exemplary core harvester assembly stored upon another exemplary core harvester storage assembly.
Figure 23:
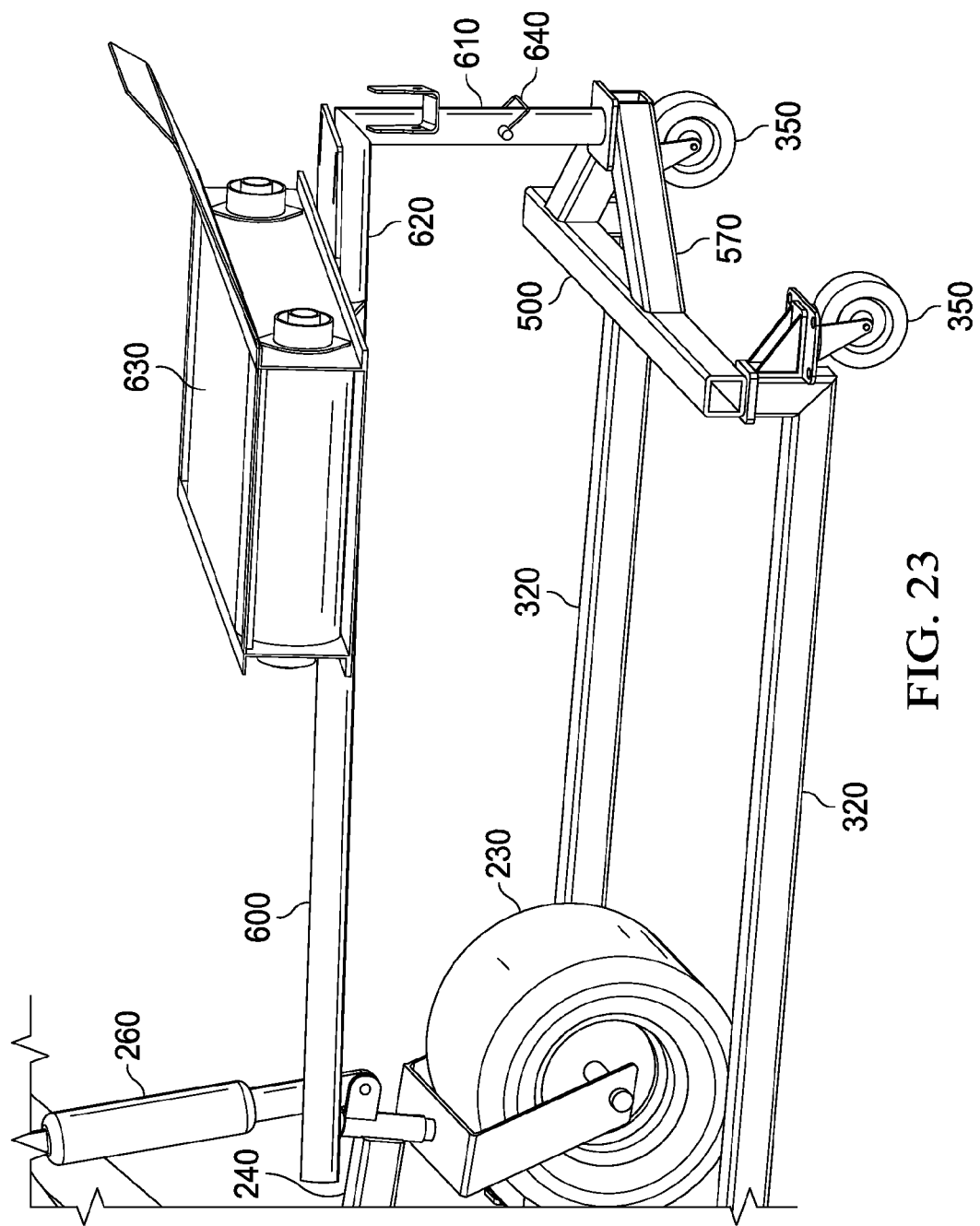
FIG. 23 is a perspective view of part of the exemplary core harvester assembly stored upon an exemplary core harvester storage assembly, as shown in FIG. 22.
Figure 24:
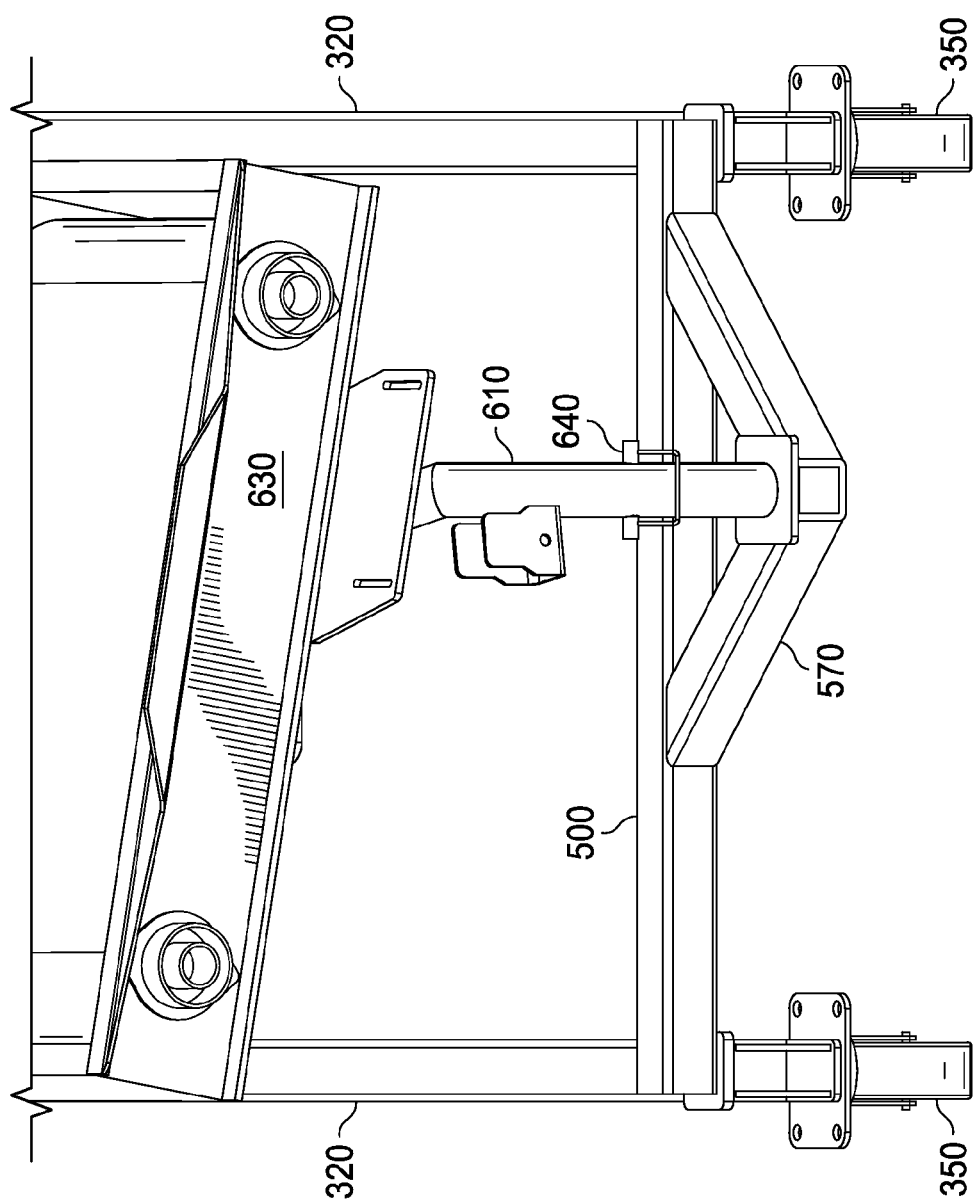
FIG. 24 is an end perspective view of part of the exemplary core harvester assembly stored upon an exemplary core harvester storage assembly, as shown in FIG. 22.

As shown in FIGS. 22, 23, and 24, an alternate embodiment of conveyor assembly 140 generally includes an L-shaped support bracket 600 comprising a first vertically oriented section 610 and a second horizontally oriented section 620. The first section 610 of bracket 600 may be adapted to mount with the stake pockets of the storage area 220 of the truck 110. In one embodiment, the section 610 would mount within a stake pocket proximate the forward end of the storage area 220 (i.e., near the operator of the truck 110). The section 620, then, would extend rearwardly along an upper portion of the storage compartment 220 and appropriately be secured (e.g., at a second stake pocket located toward the rear of the truck 110). A conveyor unit 630 may be mounted to the section 620, so that the unit 630 may be operably coupled to the truck 110 to deliver cores from the elevator assembly 130 to the storage compartment 220.

For storage, the section 610 may be removably disposed upon or within the vertical post 560. A cotter key or other pin 640 may be used to limit movement of the alternate conveyor assembly embodiment relative to the storage rack.

In one embodiment, the storage rack assembly may be adapted with holders that directly operably removably couple to the collector assembly 120 in order to store such assembly. Alternately, the collector assembly 120 may be removably positioned proximate the elevator assembly 130 during storage.

As shown, for example, in FIGS. 17-20, a generally L-shaped main pin 700 may be removably inserted through a portion of the elevator assembly 130. The relatively elongated portion of the main pin 700 extending through the elevator assembly 130 may include two holes 710 through which a cotter key or other secondary pins 720 may be inserted. The mounting bracket 190 of collector assembly 120 may be removably disposed upon a portion of the extending portion of the relatively elongated portion of the main pin 700 between the secondary pins 720, which act to secure the main pin 700 and collector assembly 120. A strap 730 (FIG. 17) also may be used to inhibit movement of the collector assembly 120 during storage.

In accordance with the description herein, a method of storing a core harvester mounted on a truck may include the following steps:

1. Remove the collector assembly 120 from the core harvester.

2. Remove the bar 500 and its associated conveyor assembly support from end 340 of the storage rack assembly.

3. From the front, position the end 340 of the storage rack assembly about the support assembly 250, including wheel 230.

4. Align the storage rack so that at least three points of support for the core harvester may be effected. The seat 360 should be positioned to engage the axle 240. The two connectors 400 should be positioned to engage with the extensions 410 upon insertion of the pins 430 and placement of the holding mechanisms 420 to secure the attachments.

5. After three points of support are established, the core harvester is disconnected from the truck and the bar 500 and its associated conveyor assembly support from end 340 of the storage rack assembly is replaced into position.

6. The conveyor assembly is loaded onto its support at end 340 of the storage rack assembly.

7. The collector assembly is secured to the elevator assembly. The main pin 700 is inserted; a secondary pin is inserted through the hole in the main pin nearest the elevator assembly; the mounting bracket 190 of the collector assembly is positioned on the main pin; a second secondary pin is inserted into the remaining hole in the main pin to secure the collector assembly in place; and a strap may be added to help limit movement of the collector assembly.

8. Operation of the jack lifts the wheel 230 off the ground, enabling the core harvester to be easily moved upon the storage rack assembly to its storage location.

To mount a stored core harvester on a truck, the above steps generally are reversed. Of course, the exact steps, as well as the order in which they are performed in either case, ultimately will depend upon the circumstances involved in a particular application.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. An assembly comprising:
   a core harvester disposed on a storage rack,
      the core harvester including a collector assembly, an elevator assembly, a conveyor assembly, and a support assembly including an axle operatively coupling a wheel to the elevator assembly; and
      the storage rack including:
         a frame including a first end and a second end;
         a plurality of wheels operatively coupled about a lower portion of the frame;
         a jack operatively coupled to an upper portion of the frame, the jack including a seat engaged with the elevator assembly of the core harvester at a first point; and
         an immovable brace operatively coupled to the first end of the frame, the brace engaging the elevator assembly of the core harvester at two spaced-apart points proximate a forward portion of the core harvester elevator assembly.

2. The assembly of claim 1, wherein the jack is disposed between the first end and the second end of the frame.

3. The assembly of claim 1, wherein the seat comprises a U-shaped member engaging the axle.

4. The assembly of claim 3, wherein the jack includes a motor and a gear.

5. The assembly of claim 1, wherein the brace includes two T-shaped connectors positioned to attach to the elevator assembly at the two spaced-apart points.

6. An assembly comprising:
   a core harvester assembly disposed upon a storage rack assembly,
      the core harvester assembly including a collector assembly, an elevator assembly, a conveyor assembly, and a support assembly including an axle operatively coupling a wheel to the elevator assembly; and
   the storage rack assembly including:
      a frame including a first end and a second end;
      a plurality of wheels operatively coupled about a lower portion of the frame;
      a jack operatively coupled to an upper portion of the frame, the jack including a seat engaging an elevator assembly of the core harvester assembly at a first point;
      an immovable brace operatively coupled to the first end of the frame, the brace engaging the elevator assembly of the core harvester assembly at two spaced-apart points proximate a forward portion of the core harvester elevator assembly; and
      a bar adapted to releasably engage the frame at the frame second end.

7. The assembly of claim 6, further including a support frame operatively coupled to the bar and removably receiving a conveyor assembly of the core harvester.

8. The assembly of claim 7, wherein the support frame includes one or more posts that removably engages with a mounting bracket including one or more holes used to attach the conveyor assembly to a maintenance truck.

9. The assembly of claim 7, wherein the support frame includes a post upon or within which the conveyor assembly is removably placed.

10. An assembly comprising:
    a core harvester assembly disposed upon a storage rack assembly,
       the core harvester assembly including a collector assembly, an elevator assembly, a conveyor assembly, and a support assembly including an axle operatively coupling a wheel to the elevator assembly; and
    the storage rack assembly including:
       a frame including a first end and a second end, the first end including means for supporting the forward end of the elevator assembly;
       means for supporting the rearward end of the elevator assembly,
       a bar removably coupled to opposite sides of the frame at the second end, and
       support means coupled to the bar for removably receiving the conveyor assembly.

11. The assembly of claim 10, wherein the means for supporting the forward end of the elevator assembly includes an immovable brace including two connectors including tubular cross pieces, the two connectors attached to the elevator assembly at two sites at which the collector assembly may attach to the elevator assembly, the sites including two spaced tubular extensions extending in opposite directions from opposite sides of the elevator assembly, the extensions received within the tubular cross pieces and held in place with removable pins.

12. The assembly of claim 10, wherein the means for supporting the rearward end of the elevator assembly includes a jack operatively coupled to the frame between the first end and the second end, the jack including a U-shaped member engaging the support assembly at the axle, the jack operable to lift the wheel above the ground.

13. The assembly of claim 10, wherein the support means includes a support frame adapted to removably operatively couple to a means for connecting the conveyor assembly to a maintenance truck.

* * * * *